Patented Dec. 16, 1952

2,622,091

UNITED STATES PATENT OFFICE 2,622,091

LITHIUM CATALYZED ESTER INTERCHANGE REACTIONS

Henry Arnold Goldsmith, Long Island City, N. Y., assignor to Colgate-Palmolive-Peet Company, Jersey City, N. J., a corporation of Delaware No Drawing. Application November 15, 1950, Serial No. 195,909

15 Claims. (Cl. 260—410.6)

This invention relates to alcoholysis or ester interchange reactions involving natural fats and oils and more particularly to such reactions catalyzed with lithium metal.

As is well known, oils and fats consist predominantly of triglycerides. The alcoholysis of these triglycerides involves the reaction thereof with mono- and polyhydric alcohols, such as the monohydric aliphatic or cyclo-aliphatic alcohols (e. g., methanol, ethanol, n- and iso-propyl alcohol, cyclohexanol, etc.); polyhydric alcohols including ether-alcohols (e. g., glycol, glycerol, diethylene glycol, etc.); and derivatives of the latter such as still contain a free alcoholic-OH group in the molecule, among which the mono-alkyl ethers of glycol (e. g., beta-methoxy-ethanol and beta-ethoxy-ethanol) may be mentioned as especially noteworthy.

Broadly speaking, then, by alcoholysis or ester interchange according to the present invention is meant the transformation of the triglycerides of natural fats and oils into fatty acid esters of the foregoing types of compounds, all of which are characterized by the presence of at least one free alcoholic-OH group in the molecule. It will be appreciated that where glycerol itself is chosen as the alcohol reactant, the net result is to bring about a transformation of the original triglycerides into the corresponding partial (i. e., mono- and/or di-) glycerides.

It has been proposed to carry out processes of the general character mentioned above using sodium hydroxide or potassium hydroxide as catalyst to promote the reaction. However, when the alcohols are not very reactive, these catalysts are not very efficient. Relatively large amounts of such catalysts are necessary, the reactions are slow and the yields are poor even after relatively extended periods of reaction time. In order to overcome the difficulties encountered in such cases, it has been proposed to employ sodium metal as the catalyst. While this is indeed a much better catalyst for these reactions, it is difficult and dangerous to handle. In any case, whether one employs sodium metal or sodium hydroxide (or potassium hydroxide) the resulting sodium or potassium soaps are generally relatively soluble in the reaction products and are difficult to separate. Other bases that form insoluble soaps (e. g., the oxides and hydroxides of calcium, magnesium, zinc and lead) are generally not efficient as catalysts.

In accordance with the present invention, the foregoing and other disadvantages encountered in connection with catalytic alcoholysis or ester interchange reactions as applied to the triglycerides of natural fats and oils are, surprisingly, avoided by the selection of a particular catalyst, namely lithium metal, that I have found to be unusually effective. By using this catalyst in processes of the above-mentioned nature, very small amounts are sufficient to give very satisfactory results. The reaction is relatively fast, and the yields are extremely good even with relatively short periods of reaction time. Additionally, the catalyst is relatively easy to handle and in processes of this kind where soaps are produced, the lithium soaps formed tend to be insoluble in the reaction products and so are easily separated in a simple manner such as by filtration.

Accordingly, one of the principal objects of the present invention is to provide a new catalytic procedure for carrying out processes of the above-mentioned nature to achieve the foregoing and other advantages.

The manner in which these and other objects and features of the invention are attained will appear more fully from the following description thereof. Broadly, the invention involves heating to a suitable elevated reaction temperature, such as by refluxing, a mixture of triglycerides such as natural, refined or hydrogenated fats and oils and an alcohol or a compound containing at least one functional alcoholic-OH group in the molecule, while employing lithium metal as a catalyst.

More particularly, the invention involves heating to reaction temperature a mixture comprising triglycerides, an alcohol, or other organic compound having at least one alcoholic-OH group, and lithium metal; the proportions of these three components being approximately 2 to 15 mols of the alcoholic-hydroxy component per mol of the triglyceride component, and approximately 0.01% to 0.1% of lithium metal based on the weight of the triglyceride component.

In order to indicate still more fully the nature of the present invention, the following examples of typical procedure are set forth, it being understood that this description is presented by way of illustration only and not as limiting the scope of the invention.

Example 1

1 mol of hydrogenated tallow and 15 mols of betamethoxy-ethanol (methyl "Cellosolve") are admixed and 0.1% of lithium metal, in ribbon form, based on the weight of the hydrogenated tallow, is added to the mixture. This mixture is then heated to reflux for a period of 5 minutes, the still temperature rising to 125° C. The reaction is completed during the relatively short time required to bring the reaction mixture to reflux temperatures. The heating is then discontinued, the mixture is allowed to cool slightly, and the catalyst is neutralized. Excess beta-methoxy-ethanol is distilled off and the residue distilled in vacuo. Glycerol formed during the reaction is drained from the residue and the oily product remaining is vacuum distilled. 90–95% of the oily product is taken over at 160–185° C. at 1 mm. of mercury, indicating a 90–95% conversion to the desired beta-methoxy-ethyl esters of the palmitic and stearic acids that were present in combined form in the original hydrogenated tallow.

Example II

In another slightly different procedure, 1 mol of hydrogenated tallow is admixed with 15 mols of beta-methoxy-ethanol, and to the resulting mixture is added 0.03% of lithium metal, based on the weight of the hydrogenated tallow. This mixture is taken to reflux temperatures in 35 minutes (80° to 135°). The reaction product was washed twice with water and enough sulfuric acid to neutralize the catalyst. The resulting emulsion was broken by heat, the water layer drained, and the oily layer distilled in vacuo (at 1 mm. Hg). In this manner 94% of the oily layer is recovered as the mixed beta-methoxy-ethyl esters of palmitic and stearic acids that were present in combined form in the original hydrogenated tallow.

Example III

The procedure of Example II is repeated except that 0.05% lithium is added when the reaction mixture is heated to a temperature of 124° C. Refluxing was continued for a period of 15 minutes and in this manner an excellent yield of the mixed beta-methoxy-ethyl esters is obtained.

In a similar manner the process of the present invention may be employed to prepare methyl, ethyl, isopropyl, etc., esters of the long chain fatty acids present in combined form in the original triglyceride starting material.

The alcoholysis or ester interchange procedures described above are applicable with any of the alcohols or other organic compounds having at least one free alcoholic-OH group present in the molecule, as described above. Generally speaking, the invention is particularly well adapted for application using monohydric alcohols having from 1 to 8 carbon atoms and with mono-alkyl ethers of polyhydric alcohols in which the alkyl radical has from 1 to 8 carbon atoms and in which the polyhydric alcohol "nucleus" has from 2 to 6 carbon atoms. Thus the invention is particularly well adapted for use in the preparation of long chain (12 to 24 carbon atoms) fatty acid esters of the foregoing compounds. The invention is also useful in the preparation of partial glycerides by reacting the triglycerides with glycerol as in the otherwise conventional partial glyceride synthesis.

While the specific examples deal particularly with the use of hydrogenated tallow as the triglyceride, it will be appreciated that any other triglyceride material, including vegetable and mineral oils and fats of natural origin whether refined or hydrogenated or otherwise preliminarily treated in such manner as not to alter their essentially triglyceride structure, may be similarly reacted. Examples are babassu oil, castor oil, Chinese vegetable tallow, coconut oil, corn oil, cottonseed oil, fish oils of various kinds, lard, linseed oil, olive oil, palm and palm kernel oil, peanut oil, soybean oil, tung oil, etc.

The lithium metal may be employed in any desired or convenient form, such as pellets, granules, ribbon, wire, etc.

Preferably the reaction is carried out under conditions of efficient agitation of the reactants. In some cases sufficient agitation may be provided by the thermal convection currents normally induced by the heating operation but in many cases, especially where relatively viscous reactants are employed and/or where relatively large quantities of reactants are present in the reaction mixture, it will be preferred to resort to mechanical agitation in addition to such agitation as may be provided by the thermal convection currents that are normally set up in the reaction mixture.

While specific examples of preferred methods embodying the present invention have been set forth above, it will be apparent that many changes and modifications may be made in the methods of procedure without departing from the spirit of the invention. It will therefore be understood that the examples cited and the particular proportions and methods of operation set forth above are intended to be illustrative only, and are not intended to limit the scope of the invention.

What is claimed is:

1. A process comprising reacting a triglyceride with an organic compound having at least one alcoholic-OH group in the molecule in the presence of metallic lithium as catalyst.

2. In a process of effecting an ester interchange reaction between reactants comprising a triglyceride and an organic compound having at least one alcoholic-OH group in the molecule, the step of heating the reactants to elevated temperature in the presence of metallic lithium as catalyst.

3. A process comprising reacting natural fats and oils with an organic compound having at least one alcoholic-OH group in the molecule and capable of bringing about an alcoholysis of the natural fats and oils in the presence of catalytic amounts of metallic lithium.

4. In a process of effecting an ester interchange reaction between reactants comprising a triglyceride and an organic compound selected from the class consisting of monohydric alcohols, polyhydric alcohols, and mono-alkyl ethers of polyhydric alcohols, the step of heating the reactants to elevated temperature in the presence of metallic lithium as catalyst.

5. A process comprising heating to reflux temperatures a mixture of (a) a triglyceride and (b) an organic compound having at least one alcoholic-OH group in the molecule in the ratio of 2 to 15 mols of (b) per mol of (a), and in the presence of metallic lithium as catalyst.

6. A process comprising heating to reflux temperatures a mixture of (a) a triglyceride and (b) an organic compound having at least one alcoholic-OH group in the molecule in the ratio of 2 to 15 mols of (a) per mol of (b), and in the presence of metallic lithium as catalyst in the amount of about 0.01% to 0.1% based on the weight of the triglyceride.

7. In a process of effecting an ester interchange reaction between reactants comprising a triglyceride and a monohydric alcohol having from 1 to 8 carbon atoms, the step of heating the reactants to elevated temperature in the presence of metallic lithium as catalyst.

8. In a process of effecting an ester interchange reaction between reactants comprising a triglyceride and a polyhydric alcohol having from 2 to 6 carbon atoms, the step of heating the reactants to elevated temperature in the presence of metallic lithium as catalyst.

9. In a process of effecting an ester interchange reaction between reactants comprising a triglyceride and a mono-alkyl ether of a polyhydric alcohol, the step of heating the reactants to elevated temperature in the presence of metallic lithium as catalyst.

10. The process as in claim 9 wherein the mono-alkyl group has from 1 to 8 carbon atoms.

11. A process of effecting an ester interchange reaction comprising heating (a) a triglyceride with (b) a mono-alkyl ether of a dihydric alcohol, in the ratio of 2 to 15 mols of (b) per mol of (a), and in the presence of about 0.01% to 0.1% of metallic lithium based on the weight of the triglyceride.

12. A process as in claim 11 in which the mono-alkyl ether is beta-methoxy-ethanol.

13. A process as in claim 11 in which the mono-alkyl ether is beta-ethoxy-ethanol.

14. A process as in claim 11 in which the mono-alkyl ether is beta-butoxy-ethanol.

15. A process for effecting alcoholysis which comprises heating to reflux temperatures a mixture of (a) triglycerides obtained from natural fats and oils and (b) an organic compound selected from the group consisting of monohydric alcohols, polyhydric alcohols and monoalkyl ethers of polyhydric alcohols, in the ratio of 2 to 15 mols of (b) per mol of (a), and in the presence of metallic lithium as a catalyst, said metallic lithium being present in an amount of about 0.01% to 0.1% based on the weight of the triglycerides.

HENRY ARNOLD GOLDSMITH.

REFERENCES CITED

The following references are of record in the file of this patent:

UNITED STATES PATENTS

| Number | Name | Date |
|---|---|---|
| 2,360,394 | Burrell | Oct. 17, 1944 |
| 2,469,371 | Colbeth | May 10, 1949 |